(12) United States Patent
Zhang

(10) Patent No.: US 11,138,740 B2
(45) Date of Patent: Oct. 5, 2021

(54) IMAGE PROCESSING METHODS, IMAGE PROCESSING APPARATUSES, AND COMPUTER-READABLE STORAGE MEDIUM

(71) Applicant: GUANGDONG OPPO MOBILE TELECOMMUNICATIONS CORP., LTD., Guangdong (CN)

(72) Inventor: Xueyong Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/814,697

(22) Filed: Mar. 10, 2020

(65) Prior Publication Data
US 2020/0211197 A1    Jul. 2, 2020

Related U.S. Application Data

(63) Continuation of application No. PCT/CN2018/105101, filed on Sep. 11, 2018.

(30) Foreign Application Priority Data

Sep. 11, 2017 (CN) .......................... 201710811959.7
Sep. 11, 2017 (CN) .......................... 201710812444.9
Sep. 11, 2017 (CN) .......................... 201710814287.5

(51) Int. Cl.
*G06T 7/12*    (2017.01)
(52) U.S. Cl.
CPC ...... *G06T 7/12* (2017.01); *G06T 2207/10012* (2013.01); *G06T 2207/10028* (2013.01)
(58) Field of Classification Search
CPC ............. G06T 7/12; G06T 2207/10012; G06T 2207/10028
See application file for complete search history.

(56) References Cited

U.S. PATENT DOCUMENTS 6,731,799 B1 * 5/2004 Sun .................... G06K 9/00369
348/142
8,094,928 B2 * 1/2012 Graepel ................ A63F 13/213
382/154
(Continued)

FOREIGN PATENT DOCUMENTS

CN        101893935 A    11/2010
CN        102194248 A     9/2011
(Continued)

OTHER PUBLICATIONS

English translation of ISR for PCT application PCT/CN2018/105101 dated Nov. 29, 2018.
(Continued)

*Primary Examiner* — Gregory M Desire
(74) *Attorney, Agent, or Firm* — Young Basile Hanlon & MacFarlane, P.C.

(57) ABSTRACT

The present disclosure provides an image processing method, an image processing apparatus, an electronic device, and a computer-readable storage medium. The image processing method of the embodiment of the present disclosure is for an electronic device. The method includes: acquiring a depth image of a current user, and acquiring a three-dimensional (3D) background image of a scene populated by the current user; performing edge extraction on the 3D background image to acquire depth data, in the 3D background image, of edge pixels of a target object in the 3D background image; determining whether the current user collides with the target object in the scene based on the depth image of the current user and the depth data of the edge pixels of the target object; and performing a predetermined operation on the electronic device in response to that the current user collides with the target object.

18 Claims, 9 Drawing Sheets

(56) References Cited

U.S. PATENT DOCUMENTS

| | | | | |
|---|---|---|---|---|
| 8,625,897 | B2* | 1/2014 | Criminisi | G06T 7/11 |
| | | | | 382/173 |
| 8,907,968 | B2* | 12/2014 | Tanaka | G06T 15/20 |
| | | | | 345/585 |
| 10,319,104 | B2* | 6/2019 | Zhao | G06T 7/564 |
| 10,431,006 | B2* | 10/2019 | Mahler | G06F 3/016 |
| 2011/0193860 | A1* | 8/2011 | Lee | H04N 13/261 |
| | | | | 345/419 |
| 2014/0253679 | A1* | 9/2014 | Guigues | H04N 13/128 |
| | | | | 348/42 |
| 2017/0069071 | A1* | 3/2017 | Jung | G06T 7/194 |

FOREIGN PATENT DOCUMENTS

| | | |
|---|---|---|
| CN | 102737281 A | 10/2012 |
| CN | 102744733 A | 10/2012 |
| CN | 103150543 A | 6/2013 |
| CN | 103530903 A | 1/2014 |
| CN | 103576686 A | 2/2014 |
| CN | 103907138 A | 7/2014 |
| CN | 104134235 A | 11/2014 |
| CN | 104504671 A | 4/2015 |
| CN | 105046710 A | 11/2015 |
| CN | 205059421 U | 3/2016 |
| CN | 205302188 U | 6/2016 |
| CN | 106909911 A | 6/2017 |
| CN | 106919254 A | 7/2017 |
| CN | 107077755 A | 8/2017 |
| CN | 107610127 A | 1/2018 |
| CN | 107610134 A | 1/2018 |
| CN | 107742300 A | 2/2018 |
| JP | 2009146368 A | 7/2009 |
| WO | 2019047982 A1 | 3/2019 |

OTHER PUBLICATIONS

English translation of OA for CN application 201710814287.5.
English translation of OA for CN application 201710812444.9.
English translation of OA for CN application 201710811959.7.
Search report for EP application 18853010.9 dated Oct. 9, 2020.
Rejection Decision and English Translation for CN application 201710812444.9 dated Jul. 29, 2020.
Multicamera Real-Time 3D Modeling for Telepresence and Remote Collaboration; Benjamin Petit et al; Jan. 1, 2010; pp. 1-12.
Direct Haptics in MASSIVE Virtual Reality Experiences; Cristiana Ramos et al.; Feb. 22, 2016.
Development of structured light based bin picking system using primitive models; Jong-Kyu Oh et al.; Nov. 17, 2009 pp. 46-52.
Depth camera based collision avoidance via active robot control; Bernard Schmidt, Lihui Wang; Oct. 1, 2014; pp. 711-718.

* cited by examiner structured-light image of measured object structured-light image of reference surface truncated phase image of measured object truncated phase image of reference surface continuous phase image of
measured object continuous phase image of
reference surface

IMAGE PROCESSING METHODS, IMAGE PROCESSING APPARATUSES, AND COMPUTER-READABLE STORAGE MEDIUM

CROSS-REFERENCE TO RELATED APPLICATION(S)

This application is a continuation application of International Patent Application No. PCT/CN2018/105101, filed on Sep. 11, 2018, which claims priority to and benefits of Chinese Patent Application Nos. 201710814287.5, 201710811959.7 and 201710812444.9, all filed on Sep. 11, 2017, the entire content of all of which are incorporated herein by reference in their entireties.

TECHNICAL FIELD

The present disclosure relates to the field of image processing technologies, and more particularly, to an image processing method, an image processing apparatus, and a computer-readable storage medium.

BACKGROUND

Existing technologies for remaindering a collision between a person and an object in the background generally utilize feature points to extract a person's outline and an object's outline, and determine whether a current user collides with the object in the background based on the person's outline and the object's contour. However, the accuracy of the person's outline and the object's outline extracted using the feature points is not high, and in particular, boundaries of the person and the object cannot be accurately demarcated, which affects the effect of determining whether the person collides with the object.

SUMMARY

The image processing method of the embodiment of the present disclosure is for an electronic device. The method includes: acquiring a depth image of a current user, and acquiring a three-dimensional (3D) background image of a scene populated by the current user; performing edge extraction on the 3D background image to acquire depth data, in the 3D background image, of edge pixels of a target object in the 3D background image; determining whether the current user collides with the target object in the scene based on the depth image of the current user and the depth data of the edge pixels of the target object; and performing a predetermined operation on the electronic device in response to that the current user collides with the target object.

The image processing apparatus of the embodiment of the present disclosure is for an electronic device. The apparatus includes: a depth image acquisition subassembly and a processor. The depth image acquisition subassembly is configured to acquire a depth image of a current user, and acquire a 3D background image of a scene populated by the current user. The processor is configured to: perform edge extraction on the 3D background image to acquire depth data, in the 3D background image, of edge pixels of a target object in the 3D background image; determine whether the current user collides with the target object in the scene based on the depth image of the current user and the depth data of the edge pixels of the target object; and perform a predetermined operation on the electronic device in response to that the current user collides with the target object.

The computer-readable storage medium of the embodiment of the present disclosure includes a computer program used in combination with an electronic device capable of capturing. The computer program is executable by a processor to realize the above image processing method.

Additional aspects and advantages of embodiments of the present disclosure will be given in part in the following descriptions, become apparent in part from the following descriptions, or be learned from the practice of the embodiments of the present disclosure.

BRIEF DESCRIPTION OF DRAWINGS

The above and/or additional aspects and advantages of embodiments of the present disclosure will become apparent and more readily appreciated from the following descriptions made with reference to the drawings, in which.

DETAILED DESCRIPTION

Figure 1:
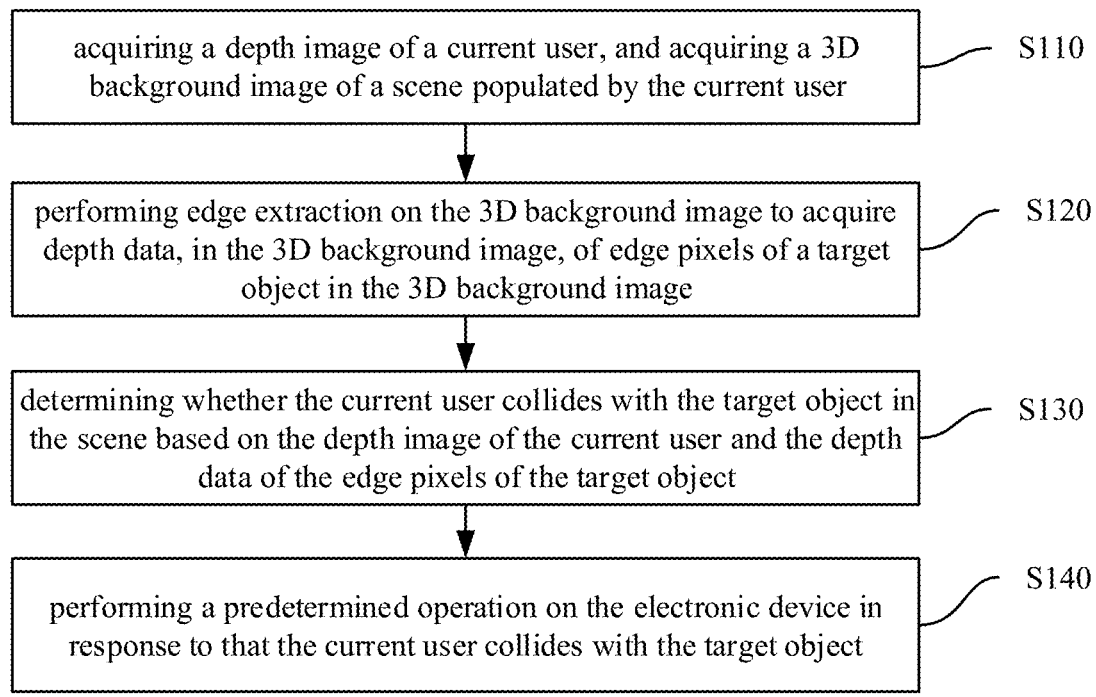
FIG. 1 is a flowchart of an image processing method according to some embodiments of the present disclosure.

Embodiments of the present disclosure will be described in detail and examples of the embodiments are illustrated in the drawings. The same or similar elements and the elements having the same or similar functions are denoted by like reference numerals throughout the descriptions. Embodiments described herein with reference to drawings are explanatory, which serve to explain the present disclosure, but are not construed to limit the present disclosure.

An image processing method, an image processing apparatus, an electronic device, and a computer-readable storage medium according to embodiments of the present disclosure are described below with reference to the drawings.

Figure 2:
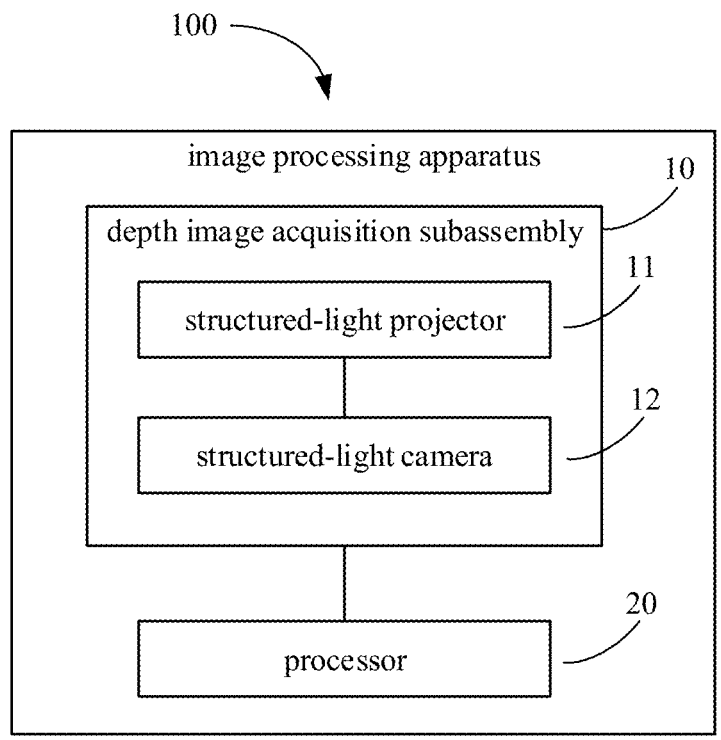
FIG. 2 is a block diagram of an image processing apparatus according to some embodiments of the present disclosure.
Figure 3:
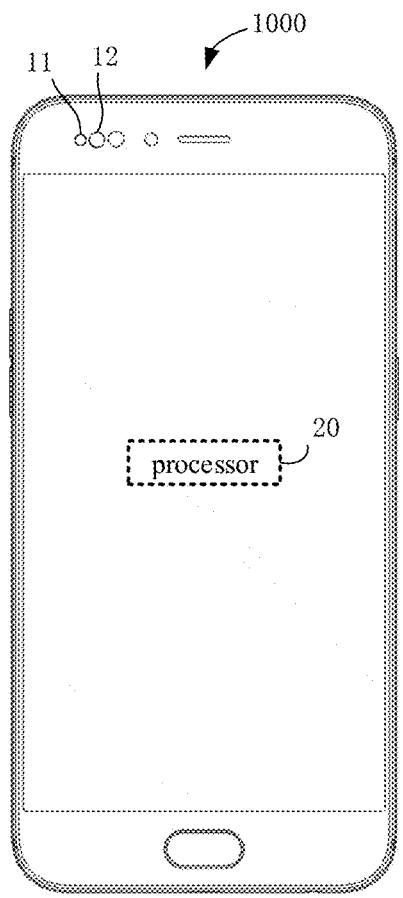
FIG. 3 is a schematic diagram of an electronic device according to some embodiments of the present disclosure.

With reference to FIGS. 1 to 3, the image processing method according to the embodiment of the present disclosure may be applicable to the electronic device 1000 according to the embodiment of the present disclosure. The image processing method may include the following.

At block S110, a depth image of a current user is acquired, and a 3D background image of a scene populated by the current user is acquired.

At block S120, edge extraction is performed on the 3D background image to acquire depth data, in the 3D background image, of edge pixels of a target object in the 3D background image.

As an example, the edge extraction may be performed on the 3D background image through a Canny operator. The core of the edge extraction algorithm through the Canny operator may include the following acts. First, the 3D background image is convolved with a 2D Gaussian filtering template to eliminate noise. Then, a gray gradient value of each pixel is acquired by using a differential operator, a gray gradient direction of each pixel is calculated based on the gradient value, and adjacent pixels of the corresponding pixel along the gradient direction may be found through the gradient direction. Then, each pixel is traversed. If the gray value of the pixel is not the largest, compared with the gray values of two front and rear adjacent pixels along its gradient direction, this pixel is not considered as an edge point. In this way, pixels at edge positions in the 3D background image may be determined, thereby acquiring the edge pixels of the target object after the edge extraction, and further acquiring the depth data of the edge pixels of the target object in the 3D background image.

At block S130, it is determined whether the current user collides with the target object in the scene based on the depth image of the current user and the depth data of the edge pixels of the target object.

At block S140, a predetermined operation is performed on the electronic device in response to that the current user collides with the target object.

With reference to FIG. 2 and FIG. 3, the image processing method according to the embodiment of the present disclosure may be implemented by the image processing apparatus 100 according to the embodiment of the present disclosure. The image processing apparatus 100 according to the embodiment of the present disclosure may be applicable to the electronic apparatus 1000 according to the embodiment of the present disclosure. The image processing apparatus 100 may include a depth image acquisition subassembly 10 and a processor 20. The act at block S110 may be implemented by the depth image acquisition subassembly 10. The acts at blocks S120 to S140 may be implemented by the processor 20.

That is, the depth image acquisition subassembly 10 may be configured to acquire a depth image of a current user, and acquire a 3D background image of a scene populated by the current user. The processor 20 may be configured to: perform edge extraction on the 3D background image to acquire depth data, in the 3D background image, of edge pixels of a target object in the 3D background image; determine whether the current user collides with the target object in the scene based on the depth image of the current user and the depth data of the edge pixels of the target object; and perform a predetermined operation on the electronic device in response to that the current user collides with the target object.

The 3D background image may be understood as the depth image of the scene. The 3D background image may represent depth information of each person or object in the background containing the current user. The depth image of the current user may represent depth information of the person in the background containing the current user. The scene range of the 3D background image is consistent with the scene range of the depth image of the current user. The corresponding depth information may be found in the depth image for each pixel in the 3D background image.

It should also be noted that the scene populated by the current user may be a virtual scene, such as a virtual scene provided by an electronic device, or a physical scene, i.e., a real scene populated by the current user.

The image processing apparatus according to the embodiment of the present disclosure may be applied to the electronic apparatus 1000 according to the embodiment of the present disclosure. That is, the electronic device 1000 according to the embodiment of the present disclosure may include the image processing apparatus 100 according to the embodiment of the present disclosure.

In some embodiments, the electronic device 1000 may have a capturing function, and the capturing function is to capture depth images by using a structured-light principle. For example, the electronic device 1000 may be a smart phone, a platform computer, a smart helmet, smart glasses, etc.; and also, be a VR (Virtual Reality) device, an AR (Augmented Reality) device, and the like.

Since the acquisition of the depth images is not easily affected by factors such as lighting and color distribution in the scene, and the depth information contained in the depth images has higher accuracy, the edge of the person extracted from the depth image and the edge of the object extracted from the 3D background image are more accurate, especially the edge pixels of the person and the edge pixels of the object may be accurately demarcated. Furthermore, it is better to determine whether the current user collides with the target object in the background based on the more accurate depth data of the edge pixels of the person and the more accurate depth data of the edge pixels of the object.

In some embodiments, performing the predetermined operation includes inserting an audio for a sound that is made when the target object is collided. For example, it is assumed that the target object is a water cup, the depth image acquisition subassembly 10 may acquire the depth image of the current user, and the 3D background image of the scene populated by the current user. The processor 20 may perform the edge extraction on the 3D background image to acquire depth data, in the 3D background image, of edge pixels of the water cup in the 3D background image. The processor 20 may determine whether the current user collides with the water cup in the scene based on the depth image of the current user and the depth data of the edge pixels of the water cup. If so, it means that the current user overturns the water cup in the virtual scene. At this time, the position of the water cup will change. The video in which the position of the water cup changes, such as a video of the phenomenon that should occur after the water cup is overturned, for example, a video of a pouring process of the water cup, may be inserted.

In some embodiments, performing the predetermined operation includes inserting a video in which a position of the target object changes. For example, it is assumed that the target object is a water cup, the depth image acquisition subassembly 10 may acquire the depth image of the current user, and the 3D background image of the scene populated by the current user. The processor 20 may perform the edge extraction on the 3D background image to acquire depth data, in the 3D background image, of edge pixels of the water cup in the 3D background image. The processor 20 may determine whether the current user collides with the water cup in the scene based on the depth image of the current user and the depth data of the edge pixels of the water cup. If so, it means that the current user overturns the water cup in the virtual scene. At this time, the position of the water cup will change. The video in which the position of the water cup changes, such as a video of the phenomenon that should occur after the water cup is overturned, for example, a video of a pouring process of the water cup, may be inserted.

In some embodiments, performing the predetermined operation includes generating a reminder message and providing the reminder message to the current user. That is, when determining that the current user collides with the object in the scene, the processor 20 may generate the reminder message and provide the reminder message to the current user.

As an example, the processor 20 may provide the reminder message to the current user in one or more of the following ways: a manner of announcing voice, a manner of displaying text, a manner of vibration reminder, and a manner of changing a color of a background edge in a display device. In other words, when the processor 20 generates the reminder message, it may provide the reminder message to the current user to remind the current user that "you have collided with the object at the moment, please stay away from obstacles" in one or more of the following ways, for example, the user may be reminded by the vibration of the mobile phone that the current collision with the object is caused, or the user may be reminded by announcing voice that the current collision with the object is caused, or the user may be reminded by displaying the text on the display device by means of text displaying that the current collision with the object is caused, or the user may be reminded by changing the color of the background edge in the display device that the current collision with the object is caused.

Figure 4:
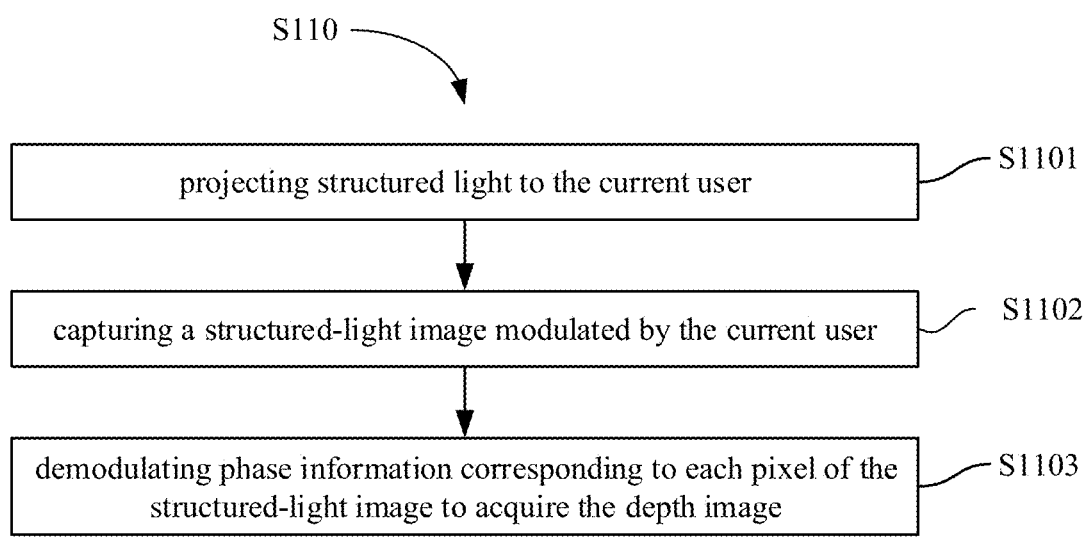
FIG. 4 is a flowchart of an image processing method according to some embodiments of the present disclosure.

As an example, referring to FIG. 4, in some embodiments, the act of acquiring the depth image of the current user at block S110 may include the following.

At block S1101, structured light is projected to the current user.

At block S1102, a structured-light image modulated by the current user is captured.

At block S1103, phase information corresponding to each pixel of the structured-light image is demodulated to acquire the depth image.

With reference to FIG. 3 again, in some embodiments, the depth image acquisition subassembly 10 may include a structured-light projector 11 and a structured-light camera 12. The act at block S1101 may be implemented by the structured-light projector 11. The acts at blocks S1102 and S1103 may be implemented by the structured-light camera 12.

That is, the structured-light projector 11 may be configured to project structured light to the current user. The structured-light camera 12 may be configured to: capture a structured-light image modulated by the current user; and demodulate phase information corresponding to each pixel of the structured-light image to acquire the depth image.

For example, the structured-light projector 11 may project structured light with a certain pattern onto the face and body of the current user. A structured-light image modulated by the current user may be formed on the face and body surface of the current user. The structured-light camera 12 captures the structured-light image modulated, and demodulates the structured-light image to acquire the depth image of the current user. The patterns of structured light may be laser fringes, Gray code, sine fringes, non-uniform speckles, and the like.

Figure 5:
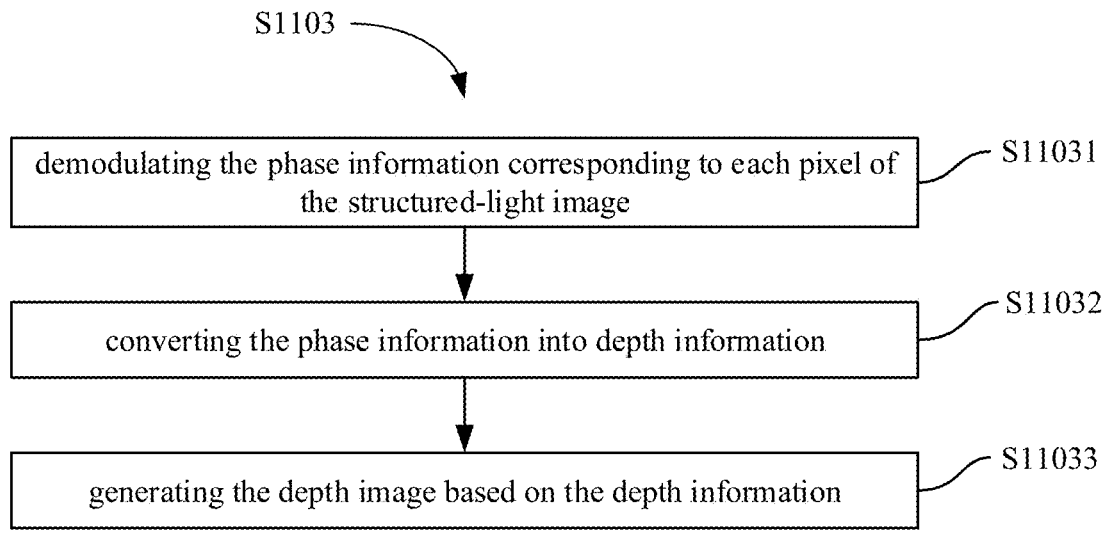
FIG. 5 is a flowchart of an image processing method according to some embodiments of the present disclosure.

Referring to FIG. 5, in some embodiments, the act, at block S1103, of demodulating the phase information corresponding to each pixel of the structured-light image to acquire the depth image may include the following.

At block S11031, the phase information corresponding to each pixel of the structured-light image is demodulated.

At block S11032, the phase information is converted into depth information.

At block S11033, the depth image of the current user is generated based on the depth information.

With reference to FIG. 2 again, in some embodiments, the acts at blocks S11031, S11032, and S11033 may all be implemented by the structured-light camera 12.

That is, the structured-light camera 12 may be further configured to: demodulate the phase information corresponding to each pixel of the structured-light image; convert the phase information into depth information; and generate the depth image based on the depth information.

For example, compared with the unmodulated structured light, the phase information of the modulated structured light has changed. The structured light shown in the structured-light image is structured light that has been distorted. The changed phase information may represent the depth information of the object. Therefore, the structured-light camera 12 first demodulates the phase information corresponding to each pixel in the structured-light image, and then calculates depth information according to the phase information, thereby acquiring the final depth image.

In order to make those skilled in the art more clearly understand the process of collecting the depth images of the face and body of the current user based on the structure light, the following describes a specific principle with a widely-used grating projection technology (stripe projection technology) as an example. The grating projection technology belongs to the surface structured light in a broad sense.

Figure 6A:
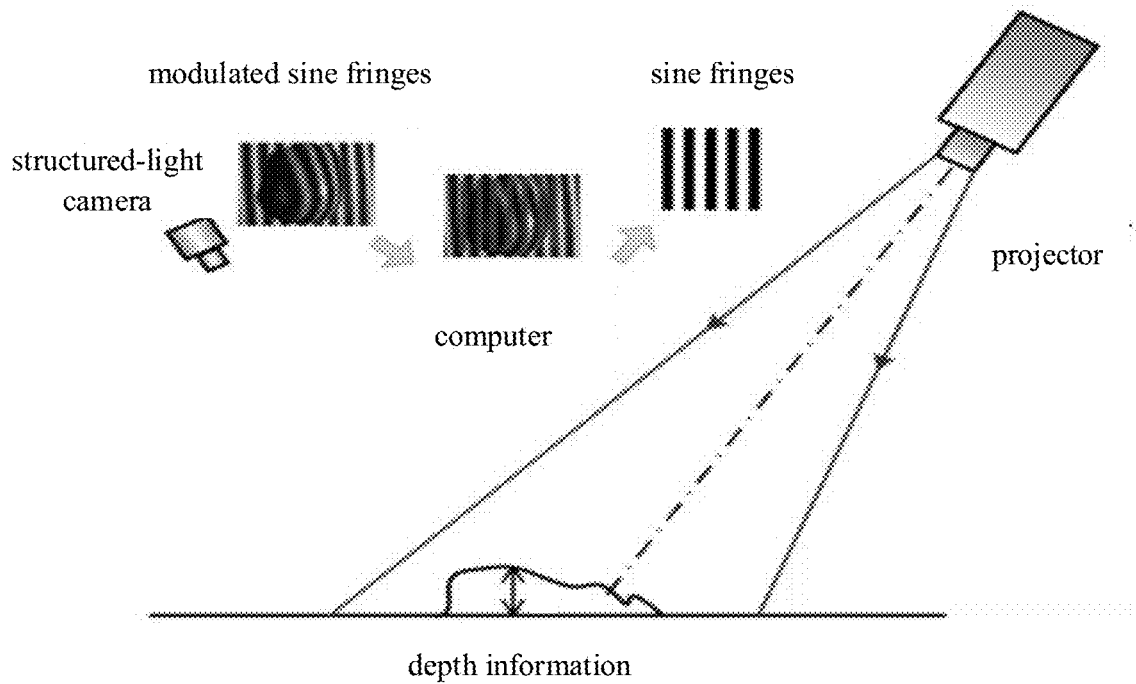
FIGS. 6A-6E are schematic diagrams of a scenario of structured-light measurement according to an embodiment of the present disclosure.

As illustrated in FIG. 6A, when using the surface structured light to project, sine fringes may be generated by computer programming. The sine fringes may be projected to the measured object by the structured-light projector 11. The structured-light camera 12 is utilized to capture the degree of bending of the fringes after being modulated by the object, and to demodulate the bended fringes to acquire phases, and to convert the phases into depth information to acquire the depth image. In order to avoid the problem of error or error coupling, the depth image acquisition subassembly 10 needs to be calibrated before collecting depth information using structured light. The calibration includes geometric parameters (for example, relative position parameters between the structured-light camera 12 and the structured-light projector 11), internal parameters of the structured-light camera 12, and internal parameters of the structured-light projector 11.

Figure 6B:
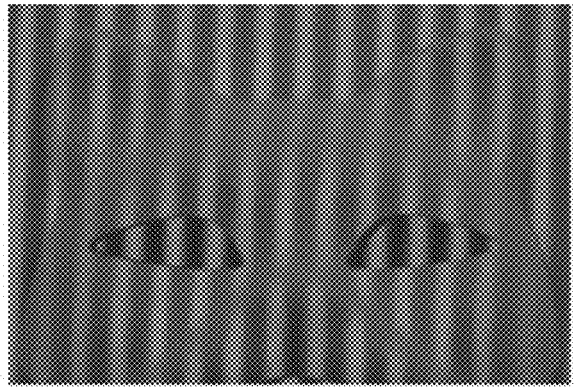
Figure 6B:
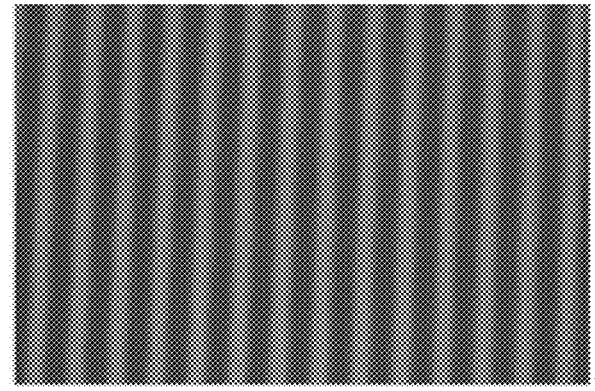

In detail, in the first act, computer programming produces sine fringes. Since it is necessary to utilize the distorted fringes to acquire the phases in the future, for example, to acquire the phases by the four-step phase-shift method, four patterns of fringes with phase difference $$\frac{\pi}{2}$$

are generated here, and the structured-light projector 11 projects the four patterns of fringes by the time-sharing manner to the measured object (the mask illustrated in 6B. The structured-light camera 12 collects the image on the left as illustrated in FIG. 6B meanwhile reads the fringes on the reference surface as illustrated on the right in FIG. 6B.

Figure 6C:
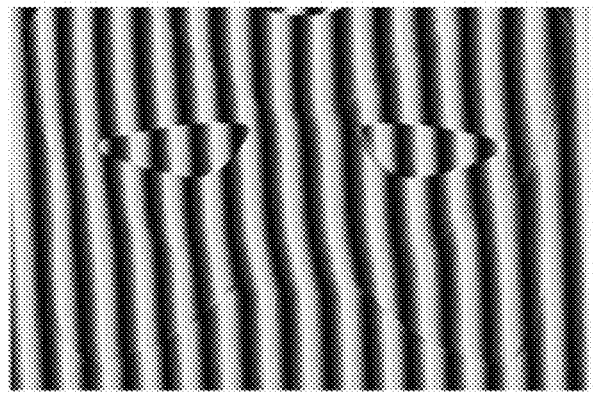
Figure 6C:
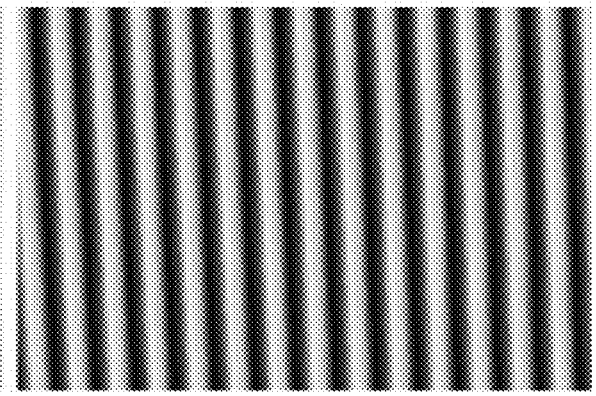

In the second step, the phase recovery is performed. The structured-light camera 12 may calculate the modulated phase based on the collected four patterns of modulated fringes (i.e., the structured-light images), and the phase image acquired at this time is a truncated phase image. Because the result acquired by the four-step phase-shifting algorithm is calculated by the arc tangent function, the phase of the modulated structured light is limited to $[-\pi,\pi]$. That is, whenever the modulated phase exceeds $[-\pi,\pi]$, it will start again. The resulting phase principal value is illustrated in FIG. 6C.

Figure 6D:
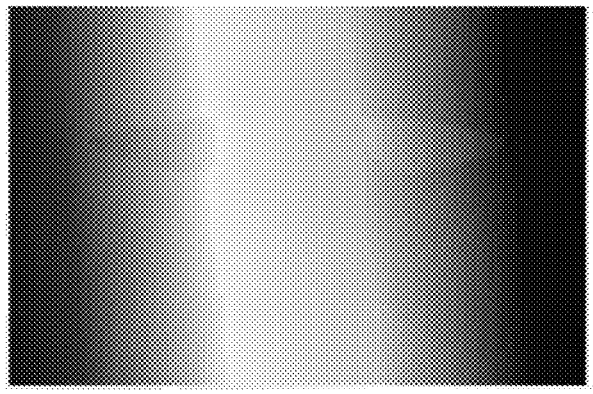
Figure 6D:
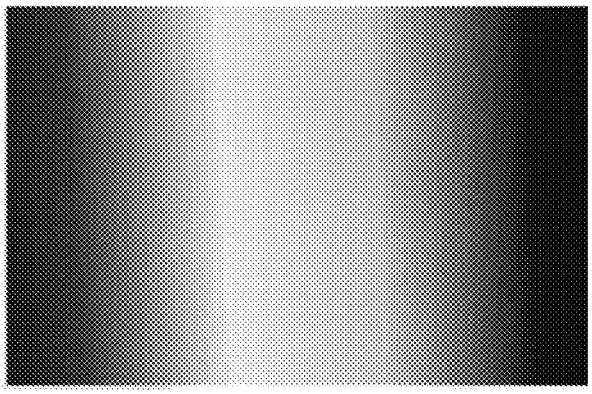

In the process of phase recovery, de-jump processing is required. That is, the truncated phase is restored to a continuous phase. As illustrated in FIG. 6D, the left side is the modulated continuous phase image, and the right side is the reference continuous phase image.

Figure 6E:
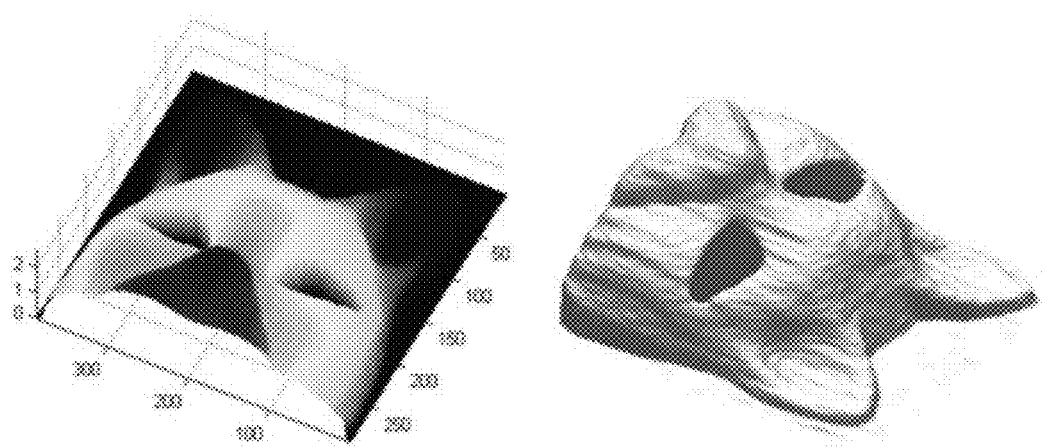

In the third act, it is to subtract the reference continuous phase from the modulated continuous phase to acquire a phase difference (i.e., phase information). The phase difference represents the depth information of the measured object relative to the reference surface, and the phase difference is substituted into a conversion formula of phase and depth (where the parameters involved in the formula are calibrated) to acquire a 3D model of the measured object as illustrated in FIG. 6E.

It should be understood that, in actual applications, according to different scenarios, the structured light utilized in the embodiment of the present disclosure may be any other pattern besides the above grating.

As a possible implementation manner, the present disclosure may also utilize the speckle structured light to collect the depth information of the current user.

Figure 7A:
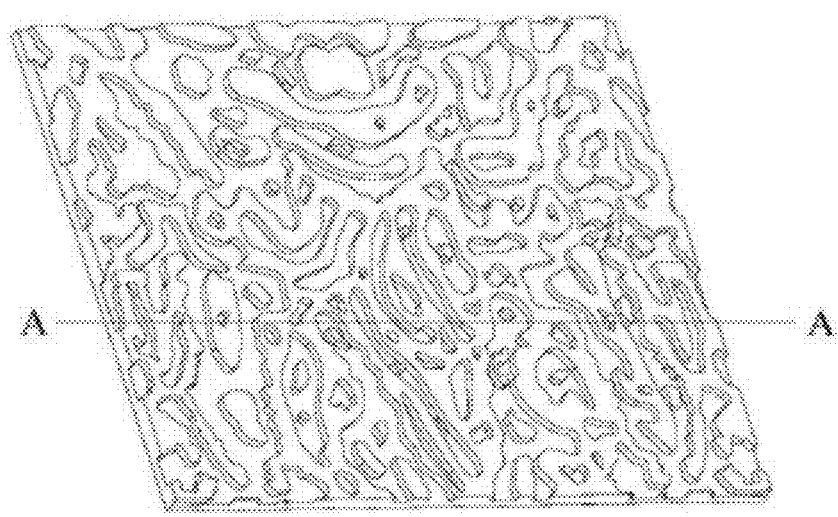
FIGS. 7A-7B are schematic diagrams of a scenario of structured-light measurement according to an embodiment of the present disclosure.
Figure 7B:
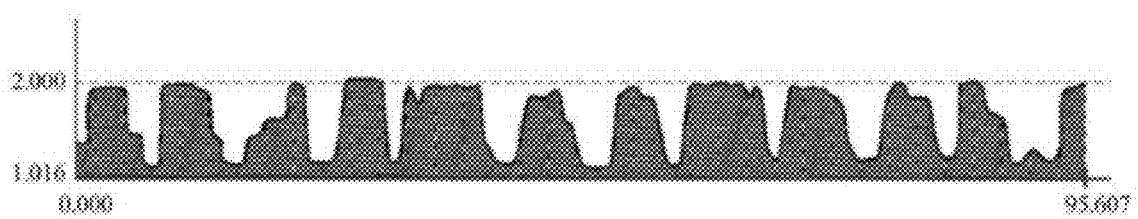

In detail, the method for acquiring depth information by the speckle structured light may utilize a diffractive element which is a plate substantially. The diffractive element has a relief diffraction structure with a specific phase distribution and a cross-section of a step relief structure having two or more irregularities. The thickness of the substrate in the diffractive element is approximately 1 micron. The height of each step is non-uniform, which may range from 0.7 micron to 0.9 micron. The structure illustrated in FIG. 7A is a partial diffraction structure of a collimating beam-splitting element of the embodiment. FIG. 7B is a sectional side view along section A-A, and the units of the abscissa and ordinate are both microns. The speckle pattern generated by the speckle structured light has a high degree of randomness, and the pattern varies with distance. Therefore, before using the speckle structured light to acquire the depth information, it needs to calibrate the speckle pattern in space. For example, within a range of 0 to 4 meters from the structured-light camera 12, a reference plane is taken every 1 centimeter. After the calibration is completed, 400 speckle images are saved. The smaller the calibration interval, the higher the accuracy of the acquired depth information. Subsequently, the structured-light projector 11 projects the speckle structured light onto the measured object (such as the current user), and the height difference of the surface of the measured object causes the speckle pattern of the speckle structured light projected on the measured object to change. The structured-light camera 12 captures a speckle pattern (i.e., a structured-light image) projected on the measured object, and performs a cross-correlation operation on the speckle pattern and each of the 400 speckle images saved after the previous calibration, thereby acquiring 400 correlation-degree images. The position of the measured object in the space will show a peak on the correlation-degree images. The depth of the measured object may be acquired by superimposing the above peaks and performing an interpolation operation.

Because ordinary diffractive elements diffract a light beam to acquire multiple diffracted light beams, the intensity of each diffracted light beam has a large difference, and the risk of harm to the human eyes is also large. Even if the diffracted light is subjected to secondary diffraction, the uniformity of the acquired beams is low. Therefore, the effect of projecting the measured object using light beams diffracted by an ordinary diffractive element is poor. In this embodiment, a collimating beam-splitting element is utilized. This element not only has the function of collimating the non-collimated beam, but also has the function of splitting light. That is, the non-collimated light reflected by the mirror passes through the collimating beam-splitting element. Multiple collimated beams are emitted at different angles, and the cross-sectional areas of the emitted multiple collimated beams are approximately equal, and the energy flux is approximately equal, so that the effect of projecting by utilizing scattered light scattered on the beam is better. At the same time, the laser output light is scattered to each beam of light, which further reduces the risk of harm to the human eyes. Compared with other structured light with uniform arrangement, the speckle structured light consumes less power when the same capturing effect is achieved.

It should also be noted that the above-mentioned implementation manner of acquiring the depth image of the current user is also applicable to acquiring the above 3D background image of the scene. For a description of the manner of acquiring the 3D background image, the foregoing description of the manner of acquiring the depth image of the current user may be referred, which is not repeated herein.

Figure 8:
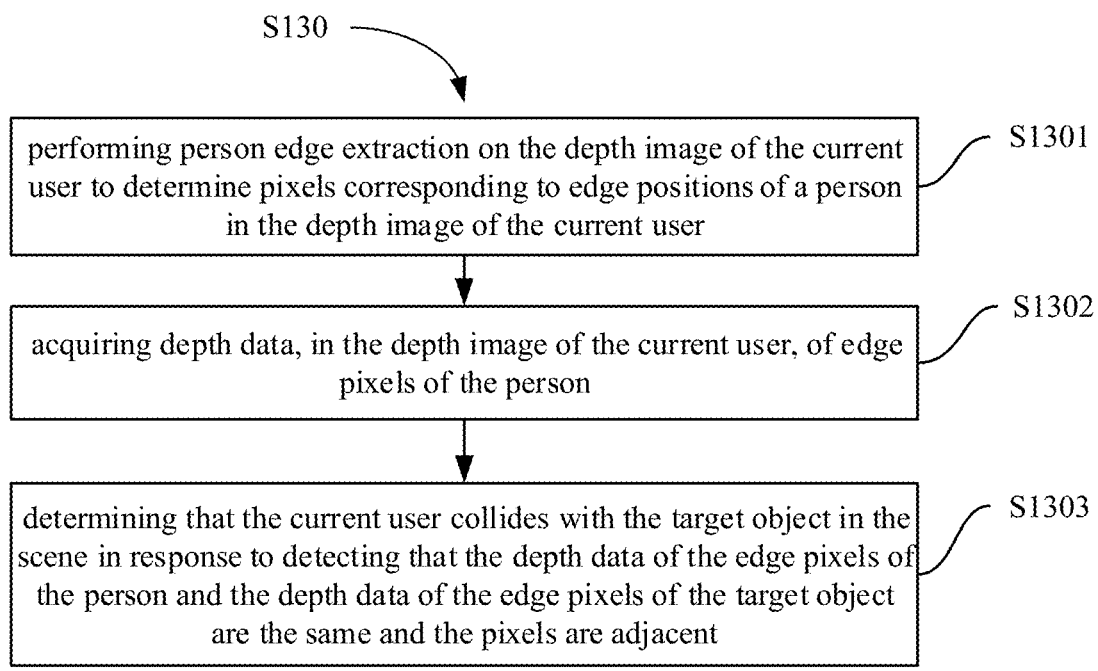
FIG. 8 is a flowchart of an image processing method according to some embodiments of the present disclosure.

Referring to FIG. 8, in some embodiments, the act at block S130 of determining whether the current user collides with the target object in the scene based on the depth image of the current user and the depth data of the edge pixels of the target object may include the following.

At block S1301, person edge extraction is performed on the depth image of the current user to determine pixels corresponding to edge positions of a person in the depth image of the current user.

At block S1302, depth data, in the depth image of the current user, of edge pixels of the person is acquired.

At block S1303, it is determined that the current user collides with the target object in the scene in response to detecting that the depth data of the edge pixels of the person and the depth data of the edge pixels of the target object are the same and the pixels are adjacent.

It should be noted that, in the embodiment of the present disclosure, when it is detected that the depth data of the edge pixels of the person and the depth data of the edge pixels of the target object are not the same, and/or the edge pixels of the person are not adjacent to the edge pixels of the target object, it may be determined that the current user does not collide with the target object in the scene.

With reference to FIG. 2 again. In some embodiments, the acts in blocks S1301, S1302, and S1303 may be implemented by the processor 20.

That is, the processor 20 may be further configured to: perform person edge extraction on the depth image of the current user to determine pixels corresponding to edge positions of a person in the depth image of the current user; acquire depth data, in the depth image of the current user, of edge pixels of the person; and determine whether the current user collides with the target object in the scene based on the depth image of the current user and the depth data of the edge pixels of the target object. When it is detected that the depth data of the edge pixels of the person and the depth data of the edge pixels of the target object are not the same, and/or the edge pixels of the person are not adjacent to the edge pixels of the target object, it may be determined that the current user does not collide with the target object in the scene. When it is detected that the depth data of the edge pixels of the person and the depth data of the edge pixels of the target object are the same and the pixels are adjacent, it may be determined that the current user collides with the target object in the scene.

As an example, the processor 20 may perform the edge extraction on the depth image of the current user by using a Canny operator. The core of the edge extraction algorithm through the Canny operator may include the following acts. First, the depth image of the current user is convolved with a 2D Gaussian filtering template to eliminate noise. Then, a gray gradient value of each pixel is acquired by using a differential operator, and a gray gradient direction of each pixel is calculated based on the gradient value, and adjacent pixels of the corresponding pixel along the gradient direction may be found through the gradient direction. Then, each pixel is traversed. If the gray value of the pixel is not the largest, compared with the gray values of two front and rear adjacent pixels along its gradient direction, this pixel is not considered as an edge point. In this way, pixels at edge positions in the depth image of the current user may be determined, thereby acquiring the edge pixels of the person after the edge extraction, and further acquiring the depth data of the edge pixels of the person in the depth image.

When the processor 20 acquires the depth data of the edge pixels of the person in the depth image of the current user, it may determine whether the current user collides with the target object in the scene according to the depth data of the edge pixels of the person and the depth data of the edge pixels of the target object. For example, when the current user moves such that the depth data of the edge pixels of the person and the depth data of the edge pixels of the target object in the scene are the same and the pixels are adjacent, it may be determined that the current user collides with the target object in the scene.

In some implementations, the processor 20 may generate a reminder message for a collision while inserting an audio for a sound that is made when the target object is collided, and provide the reminder message to the current user. As an example, the reminder message may be provided to the current user in one or more of the following ways: a manner of announcing voice, a manner of displaying text, a manner of vibration reminder, and a manner of changing a color of a background edge in a display device. In other words, when the processor 20 detects that the current user collides with the target object, in addition to inserting the audio for the sound that is made when the target object is collided, the processor 20 generates the reminder message. The processor 20 may provide the reminder message to the current user to remind the current user that "you have collided with the object at the moment, please stay away from obstacles" in one or more of the following ways, for example, the user may be reminded by the vibration of the mobile phone that the current collision with the object is caused, or the user may be reminded by announcing voice that the current collision with the object is caused, or the user may be reminded by displaying the text on the display device by means of text displaying that the current collision with the object is caused, or the user may be reminded by changing the color of the background edge in the display device that the current collision with the object is caused.

In some embodiments, the processor 20 may generate a reminder message for a collision while inserting a video in which a position of a target object changes, and provide the reminder message to the current user. As an example, the reminder message may be provided to the current user in one or more of the following ways: a manner of announcing voice, a manner of displaying text, a manner of vibration reminder, and a manner of changing a color of a background edge in a display device. In other words, when the processor 20 detects that the current user collides with the target object, in addition to inserting the video in which the position of the target object changes, the processor 20 generates the reminder message. The processor 20 may provide the reminder message to the current user to remind the current user that "you have collided with the object at the moment, please stay away from obstacles" in one or more of the following ways, for example, the user may be reminded by the vibration of the mobile phone that the current collision with the object is caused, or the user may be reminded by announcing voice that the current collision with the object is caused, or the user may be reminded by displaying the text on the display device by means of text displaying that the current collision with the object is caused, or the user may be reminded by changing the color of the background edge in the display device that the current collision with the object is caused.

Figure 9:
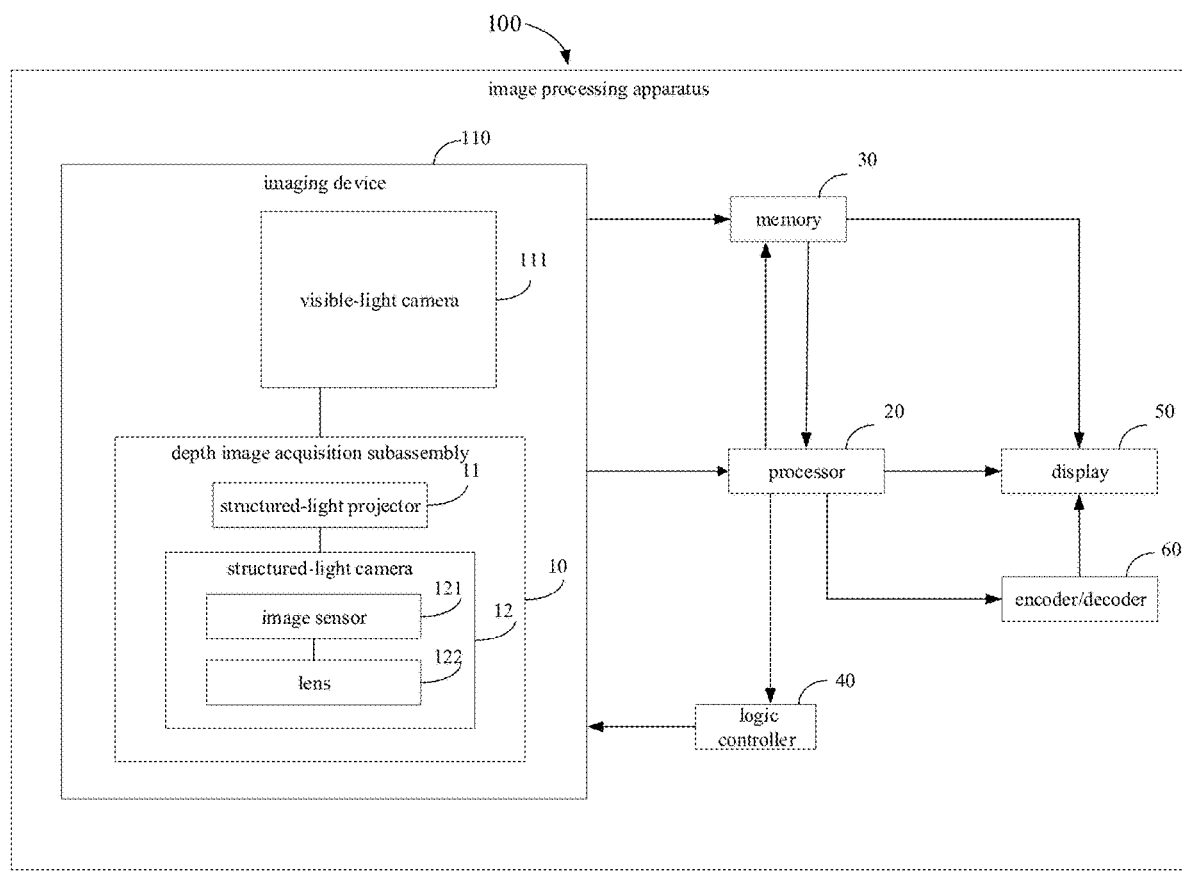
FIG. 9 is a block diagram of an image processing apparatus according to some embodiments of the present disclosure.

With reference to FIG. 3 and FIG. 9, an embodiment of the present disclosure further provides an electronic device 1000. The electronic device 1000 may include an image processing apparatus 100. The image processing apparatus 100 may be implemented using hardware and/or software. The image processing apparatus 100 may include a depth image acquisition subassembly 10 and a processor 20.

In detail, the depth image acquisition subassembly 10 may include a structured-light projector 11 and a structured-light camera 12. The depth image acquisition subassembly 10 may be configured to capture depth information of a current user to acquire a depth image of the current user, and capture depth information of a scene populated by the current user to acquire a 3D background image. For example, taking the depth image acquisition subassembly 10 to capture the depth information of the current user to acquire the depth image of the current user as an example, the structured-light projector 11 may be configured to project the structured light to the current user. The pattern of the structured light may be laser fringes, Gray code, sine fringes, or randomly-arranged speckle pattern. The structured-light camera 12 may include an image sensor 121 and a lens 122. The number of the lens 122 may be one or more. The image sensor 121 may be configured to capture a structured-light image projected by the structured-light projector 11 onto the current user. The structured-light image may be sent by the depth image acquisition subassembly 10 to the processor 20 for processing such as demodulation, phase recovery, and phase information calculation to acquire the depth information of the current user. It may be understood that, for an implementation manner of the depth information of the scene, the foregoing implementation manner of the depth information of the current user may be referred, and details are not described herein again.

In some embodiments, the image processing apparatus 100 may include an imaging device 110. The imaging device 110 may include the depth image acquisition subassembly 10 and a visible-light camera 111. The visible-light camera 111 may be configured to capture color information of a captured object to acquire a color image. The function of the visible-light camera 111 and the function of the structured-light camera 12 may be implemented by one camera, that is, the imaging device 10 includes one camera and a structured-light projector 11. The one camera may capture not only color images but also structured-light images.

In addition to utilizing the structured light to acquire depth images, it is also possible to acquire the depth image of the current user and the 3D background image of the scene through depth image acquisition methods such as binocular vision methods and Time of Flight (TOF).

The processor 20 is further configured to perform edge extraction on the 3D background image to acquire depth data, in the 3D background image, of edge pixels of the target object in the 3D background image, and perform person edge extraction on the depth image of the current user to determine pixels corresponding to edge positions of a person in the depth image of the current user; acquire depth data, in the depth image of the current user, of edge pixels of the person; and determine that the current user collides with the target object in the scene in response to detecting that the depth data of the edge pixels of the person and the depth data of the edge pixels of the target object are the same and the pixels are adjacent, and generate a reminder message for the collision, and provide the reminder message to the current user.

The image processing apparatus 100 further includes an image memory 30. The image memory 30 may be embedded in the electronic device 1000, or may be a memory independent of the electronic device 1000. The image memory 30 may include features of direct memory access (DMA). Both original image data collected by the visible-light camera 111 or data related to the structured-light image and collected by the depth image acquisition subassembly 10 may be transferred to the image memory 30 for storage or buffering. The processor 20 may read the data related to the structured-light image from the image memory 30 for processing to acquire the depth image of the current user and the 3D background image of the scene. In addition, the depth image of the current user and the 3D background image of the scene may also be stored in the image memory 30 for the processor 20 to call for processing at any time. For example, the processor 20 calls the depth image of the current user to perform person edge extraction, and call the 3D background image to extract the edge of the target object in the scene. The acquired edge pixels of the person and the depth data of the edge pixels of the person may be stored in the image memory 30, and the acquired edge pixels of the target object and the depth data of the edge pixels of the target object in the acquired 3D background image may be stored in the image memory 30.

The image processing apparatus 100 may further include a display 50. The display 50 may directly acquire the reminder message for the collision from the processor 20. The display 50 displays the reminder message to remind the user that he/she collides with the target object in the scene, to stay away from the obstacle. The image processing apparatus 100 may further include an encoder/decoder 60. The encoder/decoder 60 may encode and decode image data such as the depth image of the current user and the 3D background image of the scene. The encoded image data may be stored in the image memory. 30, and may be decompressed for display by the decoder before the image is displayed on the display 50. The encoder/decoder 60 may be implemented by a central processing unit (CPU), a GPU, or a coprocessor. In other words, the encoder/decoder 60 may be any one or more of the CPU, the GPU, and the coprocessor.

The image processing apparatus 100 further includes a logic controller 40. When the imaging device 10 is imaging, the processor 20 analyzes the data acquired by the imaging device to determine image statistical information of one or more control parameters (e.g., exposure time, etc.) of the imaging device 10. The processor 20 sends the image statistical information to the logic controller 40. The logic controller 40 controls the imaging device 10 to image based on the determine control parameters. The logic controller 40 may include a processor and/or a microcontroller that executes one or more routines, such as firmware. One or more routines may determine control parameters of the imaging device 10 based on the received image statistical information.

Figure 10:
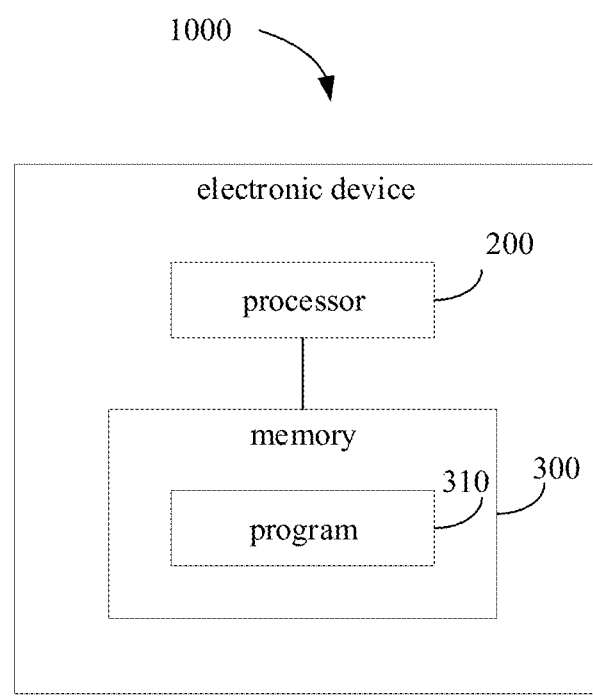
FIG. 10 is a block diagram of an electronic device according to some embodiments of the present disclosure.

Referring to FIG. 10, the electronic device 1000 according to the embodiment of the present disclosure may include one or more processors 200, a memory 300, and one or more programs 310. The one or more programs 310 are stored in the memory 300 and configured to be executed by the one or more processors 200. The one or more programs 310 may include instructions for executing the image processing method according to any one of the embodiments.

For example, in conjunction with FIG. 1, the one or more programs 310 may include instructions for executing the image processing method described in the following.

At block S110', a depth image of a current user is acquired, and a 3D background image of a scene populated by the current user is acquired.

At block S120', edge extraction is performed on the 3D background image to acquire depth data, in the 3D background image, of edge pixels of a target object in the 3D background image.

At block S130', it is determined whether the current user collides with the target object in the scene based on the depth image of the current user and the depth data of the edge pixels of the target object.

At block S140', a predetermined operation is performed on the electronic device in response to that the current user collides with the target object.

For another example, in conjunction with FIG. 5, the one or more programs 310 further includes instructions for executing the image processing method described in the following.

At block S11031', the phase information corresponding to each pixel of the structured-light image is demodulated.

At block S11032', the phase information is converted into depth information.

At block S11033', the depth image of the current user is generated based on the depth information.

For another example, in conjunction with FIG. 8, the one or more programs 310 further includes instructions for executing the image processing method described in the following.

At block S1301', person edge extraction is performed on the depth image of the current user to determine pixels corresponding to edge positions of a person in the depth image of the current user.

At block S1302', depth data, in the depth image of the current user, of edge pixels of the person is acquired.

At block S1303', it is determined that the current user collides with the target object in the scene in response to detecting that the depth data of the edge pixels of the person and the depth data of the edge pixels of the target object are the same and the pixels are adjacent.

The computer-readable storage medium of the embodiment of the present disclosure includes a computer program used in combination with the electronic device 1000 capable of imaging. The computer program may be executed by the processor 200 to complete the image processing method according to any one of the above embodiments.

For example, in conjunction with FIG. 1, the computer program may be executed by the processor 200 to complete the image processing method described in the following.

At block S110', a depth image of a current user is acquired, and a 3D background image of a scene populated by the current user is acquired.

At block S120', edge extraction is performed on the 3D background image to acquire depth data, in the 3D background image, of edge pixels of a target object in the 3D background image.

At block S130', it is determined whether the current user collides with the target object in the scene based on the depth image of the current user and the depth data of the edge pixels of the target object.

At block S140', a predetermined operation is performed on the electronic device in response to that the current user collides with the target object.

For another example, in conjunction with FIG. 5, the computer program may be executed by the processor 200 to complete the image processing method described in the following.

At block S11031', the phase information corresponding to each pixel of the structured-light image is demodulated.

At block S11032', the phase information is converted into depth information.

At block S11033', the depth image of the current user is generated based on the depth information.

For another example, in conjunction with FIG. 8, the computer program may be executed by the processor 200 to complete the image processing method described in the following.

At block S1301', person edge extraction is performed on the depth image of the current user to determine pixels corresponding to edge positions of a person in the depth image of the current user.

At block S1302', depth data, in the depth image of the current user, of edge pixels of the person is acquired.

At block S1303', it is determined that the current user collides with the target object in the scene in response to detecting that the depth data of the edge pixels of the person and the depth data of the edge pixels of the target object are the same and the pixels are adjacent.

In summary, with the image processing method, the image processing apparatus 100, the electronic device 1000, and the computer-readable storage medium according to the embodiments of the present disclosure, the depth data of the edge pixels of the person may be acquired from the depth image of the current user, and the depth data of the edge pixels of each object may be acquired from the 3D background image of the scene populated by the current user. It is determined whether the person collides with the target object in the 3D background based on the depth data of the edge pixels of the person and the depth data of the edge pixels of the target object. If so, the predetermined operation is executed on the electronic device, for example, making a collision reminder, or inserting the audio for the sound that is made when the target object is collided, that is, simulating the sound that is made when the target object is collided, or inserting the video in which the position of the target object changes, that is, simulating the phenomenon that should happen when the target object is collided, and so on. Because the acquisition of the depth images is not easily affected by factors such as lighting and color distribution in the scene, the person region and the target object region extracted through the depth images are more accurate, and in particular, the edge pixels of the person region and the edge pixels of the target object region may be accurately demarcated. Furthermore, the effect of determining whether the current user collides with the target object in the virtual scene, based on the more accurate depth data of the edge pixels of the person and the more accurate depth data of the edge pixels of the object, may be better. In addition, when the person collides with the target object, the image is further processed to simulate the phenomenon that should occur when the target object is collided, greatly improving the user experience.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means two or more than two, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method of imaging processing for an electronic device, comprising:
    acquiring a depth image of a current user, comprising:
        projecting structured light to the current user, capturing a structured-light image modulated by the current user, and demodulating phase information corresponding to each pixel of the structured-light image to acquire the depth image;
    acquiring a three-dimensional (3D) background image of a scene populated by the current user;
    performing edge extraction on the 3D background image to acquire depth data, in the 3D background image, of edge pixels of a target object in the 3D background image;
    determining whether the current user collides with the target object in the scene based on the depth image of the current user and the depth data of the edge pixels of the target object; and performing a predetermined operation on the electronic device in response to that the current user collides with the target object.

2. The method of claim 1, wherein demodulating the phase information corresponding to each pixel of the structured-light image to acquire the depth image comprises:
   demodulating the phase information corresponding to each pixel of the structured-light image;
   converting the phase information into depth information; and
   generating the depth image based on the depth information.

3. The method of claim 1, wherein determining whether the current user collides with the target object in the scene based on the depth image of the current user and the depth data of the edge pixels of the target object comprises:
   performing edge extraction on the depth image of the current user to determine edge pixels of a person in the depth image of the current user;
   acquiring depth data, in the depth image of the current user, of the edge pixels of the person; and
   determining that the current user collides with the target object in the scene in response to detecting that the depth data of the edge pixels of the person and the depth data of the edge pixels of the target object are the same, and the edge pixels of the person and the edge pixels of the target object are adjacent.

4. The method of claim 1, wherein performing the predetermined operation comprises inserting an audio for a sound that is made when the target object is collided.

5. The method of claim 1, wherein performing the predetermined operation comprises inserting a video in which a position of the target object changes.

6. The method of claim 1, wherein performing the predetermined operation comprises generating a reminder message and providing the reminder message to the current user.

7. The method of claim 6, wherein the reminder message is provided to the current user in one or more of the following ways:
   a manner of announcing voice, a manner of displaying text, a manner of vibration reminder, and a manner of changing a color of a background edge in a display device.

8. The method of claim 1, further comprising:
   generating a reminder message and provide the reminder message to the current user while performing the predetermined operation.

9. An image processing apparatus for an electronic device, comprising:
   a depth image acquisition subassembly, configured to:
      acquire a depth image of a current user; and
      acquire a three-dimensional (3D) background image of a scene populated by the current user; and
   a processor, configured to:
      perform edge extraction on the 3D background image to acquire depth data, in the 3D background image, of edge pixels of a target object in the 3D background image;
      determine whether the current user collides with the target object in the scene based on the depth image of the current user and the depth data of the edge pixels of the target object; and
      perform a predetermined operation on the electronic device in response to that the current user collides with the target object,
   wherein the depth image acquisition subassembly comprises:
      a structured-light projection, configured to project structured light to the current user; and
      a structured-light camera is configured to: capture a structured-light image modulated by the current user; and demodulate phase information corresponding to each pixel of the structured-light image to acquire the depth image.

10. The apparatus of claim 9, wherein the structured-light camera is configured to:
    demodulate the phase information corresponding to each pixel of the structured-light image;
    convert the phase information into depth information; and
    generate the depth image based on the depth information.

11. The apparatus of claim 9, wherein the processor is configured to:
    perform edge extraction on the depth image of the current user to determine edge pixels of a person in the depth image of the current user;
    acquire depth data, in the depth image of the current user, of the edge pixels of the person; and
    determine that the current user collides with the target object in the scene in response to detecting that the depth data of the edge pixels of the person and the depth data of the edge pixels of the target object are the same, and the edge pixels of the person and the edge pixels of the target object are adjacent.

12. The apparatus of claim 9, wherein the processor is configured to perform the predetermined operation by inserting an audio for a sound that is made when the target object is collided.

13. The apparatus of claim 9, wherein the processor is configured to perform the predetermined operation by inserting a video in which a position of the target object changes.

14. The apparatus of claim 9, wherein the processor is configured to perform the predetermined operation by generating a reminder message and providing the reminder message to the current user.

15. The apparatus of claim 14, wherein the processor is configured to provide the reminder message to the current user in one or more of the following ways:
    a manner of announcing voice, a manner of displaying text, a manner of vibration reminder, and a manner of changing a color of a background edge in a display device.

16. The apparatus of claim 9, wherein, the processor is configured to:
    generate a reminder message and provide the reminder message to the current user while performing the predetermined operation.

17. A non-transitory computer-readable storage medium comprising a computer program used in combination with an electronic device capable of capturing, the computer program being executable by a processor to realize an image processing method comprising:
    acquiring a depth image of a current user, comprising: projecting structured light to the current user; capturing a structured-light image modulated by the current user; and demodulating phase information corresponding to each pixel of the structured-light image to acquire the depth image;
    acquiring a three-dimensional (3D) background image of a scene populated by the current user;
    performing edge extraction on the 3D background image to acquire depth data, in the 3D background image, of edge pixels of a target object in the 3D background image;

determining whether the current user collides with the target object in the scene based on the depth image of the current user and the depth data of the edge pixels of the target object; and performing a predetermined operation in response to that the current user collides with the target object.

18. The non-transitory computer-readable storage medium of claim 17, wherein determining whether the current user collides with the target object in the scene based on the depth image of the current user and the depth data of the edge pixels of the target object comprises:

performing edge extraction on the depth image of the current user to determine edge pixels of a person in the depth image of the current user;

acquiring depth data, in the depth image of the current user, of the edge pixels of the person; and determining that the current user collides with the target object in the scene in response to detecting that the depth data of the edge pixels of the person and the depth data of the edge pixels of the target object are the same, and the edge pixels of the person and the edge pixels of the target object are adjacent.

* * * * *